United States Patent [19]

Kanare et al.

[11] Patent Number: 5,062,131
[45] Date of Patent: * Oct. 29, 1991

[54] TELEPHONE LINE MONITORING CIRCUIT FOR PROVIDING A VISUAL AND AUDITORY SIGNAL IF THE TELEPHONE LINE BECOMES INOPERATIVE

[75] Inventors: Edward Kanare, 4143 Via Marino; No. 1019, Marina Del Rey, Calif. 90292; Kenneth Rehler, Santa Monica,, Calif.

[73] Assignee: Edward Kanare, Marina Del Rey, Calif.

[ * ] Notice: The portion of the term of this patent subsequent to Nov. 5, 2007 has been disclaimed.

[21] Appl. No.: 584,537

[22] Filed: Sep. 18, 1989

Related U.S. Application Data

[63] Continuation-in-part of Ser. No. 462,218, Jan. 9, 1990, Pat. No. 4,969,179.

[51] Int. Cl.$^5$ .................. H04M 1/24; H04M 3/24
[52] U.S. Cl. ........................... 379/33; 379/21; 379/27
[58] Field of Search .............. 379/22, 33, 27, 32, 379/21

[56] References Cited

U.S. PATENT DOCUMENTS

| | | |
|---|---|---|
| 3,951,248 | 4/1976 | Feiner et al. . |
| 3,976,849 | 8/1976 | Champan . |
| 4,002,861 | 1/1977 | Putt . |
| 4,373,120 | 2/1983 | McDonald . |
| 4,513,176 | 4/1985 | Fostveit . |
| 4,544,807 | 10/1985 | Sers . |
| 4,564,728 | 1/1986 | Romano . |
| 4,588,862 | 5/1986 | Grabowg . |
| 4,600,810 | 7/1986 | Feldman . |
| 4,827,498 | 5/1989 | Ross ..................... 379/27 |
| 4,841,559 | 6/1989 | Curtis .................... 379/27 |
| 4,945,555 | 7/1990 | Teumer et al. ............. 379/27 X |

FOREIGN PATENT DOCUMENTS 1588941 3/1970 Fed. Rep. of Germany ........ 379/33

Primary Examiner—Stafford D. Schreyer
Attorney, Agent, or Firm—Thomas I. Rozsa

[57] ABSTRACT

A telephone line monitoring apparatus which is used to continuously monitor the telephone line and provide both a visual signal and an auditory signal if the line becomes inoperative. The circuit is designed to be plugged into a conventional telephone jack and monitor the line voltage so that if the line voltage falls below about 6 volts DC or if the line is short circuited or becomes disconnected, the telephone line monitoring apparatus will cause a light emitting diode to flash on and off and further will cause an auditory sounder to emit an audible signal. The light emitting diode is a self-flashing type which serves to modulate the auditory signal.

28 Claims, 1 Drawing Sheet

TELEPHONE LINE MONITORING CIRCUIT FOR PROVIDING A VISUAL AND AUDITORY SIGNAL IF THE TELEPHONE LINE BECOMES INOPERATIVE

This is a Continuation-In-Part of co-pending patent application Ser. No. 07/462,218 filed 01/09/90, U.S. Pat. No. 4,969,179.

BACKGROUND OF THE INVENTION

1. Field of the Invention

The present invention relates to the field of consumer telephone line monitoring apparatus which is used by the consumer to monitor the incoming telephone line to be certain that the line is operative. Oftentimes, an individual who may be waiting for an important telephone call has no idea that the telephone line has gone dead. Unless the individual tries to make a call and discovers that the line is inoperative, there is no way for the consumer to know of this. The present invention relates to the field of monitoring and signalling devices which can detect line failure and further provide both a visual signal and an auditory signal to alert a user of the problem with the incoming telephone line.

2. Description of the Prior Art

In general, line monitoring devices have been produced in the prior art. The following patents are representative of known telephone line monitoring devices:

1. U.S. Pat. No. 4,841,559 issued to Curtis on June 20, 1989 for "telephone Network Interface Tester".

2. U.S. Pat. No. 4,513,176 issued to Fostveit on Apr. 23, 1985 for "Test Apparatus For Telephone Equipment".

3. U.S. Pat. No. 4,827,498 issued to Ross on May 2, 1989 for "Telephone Line And Instrument Tester".

4. U.S. Pat. No. 3,976,849 issued to Champan on Aug. 24, 1976 for "Telephone Wiring Tester".

5. U.S. Pat. No. 4,544,807 issued to Sers on Oct. 1, 1985 for "Fault Detector Test Instrument".

6. U.S. Pat. No. 3,951,248 issued to Feiner et al on Apr. 20, 1976 for "Telephone Line Visual Status Indication Circuit".

7. U.S. Pat. No. 4,002,861 issued to Putt on Jan. 11, 1977 for "Protector Module Test Set".

8. U.S. Pat. No. 4,373,120 issued to McDonald on Feb. 8, 1983 for "Line Test Termination Device".

9. U.S. Pat. No. 4,564,728 issued to Romano on Jan. 14, 1986 for "Apparatus For Testing A Telephone Line".

10. U.S. Pat. No. 4,588,862 issued to Grabowy on May 13, 1986 for "Visual Display Network Interface".

11. U.S. Pat. No. 4,600,810 issued tp Feldman et al on July 15, 1986 for "Telephone Line Tester".

U.S. Pat. No. 4,827,498 issued to Ross relates to a telephone line tester which has a standard modular plug that can plug into a standard telephone line. The circuit of the tester is responsive to the flow of current therethrough for providing an indication of the operation of the source related equipment and/or the telephone instrument. The device is not a continuous monitoring device and requires that the user unplug the telephone and insert this plug into the line in place of the telephone line and then do the testing.

U.S. Pat. No. 3,976,849 issued to Champan illustrates a telephone wiring tester designed to receive modular terminal plug 17 and to test line voltage. This device also is not a continuous monitoring device and is a test device which is used when the telephone is unpluged. The device is used to test and check for the presence of a minimum voltage of the correct polarity between the tip and ring line conductors of a telephone installation and also to check for the presence of a proper AC lamp voltage between the ground and the lamp lead on a modular jack type telephone installation.

U.S. Pat. No. 4,544,807 issued to Sers discloses a fault detector test instrument for detecting faults on telephone lines. The device provides an indication of the most common wiring faults such as grounds, foreign E.M.F., resistance across the lines, open circuits, etc.

U.S. Pat. No. 4,513,176 to Fostveit shows a test apparatus for telephone equipment. The device discloses a multiplicity of test circuits that the owner can use to test for a problem in the line.

U.S. Pat. No. 4,841,559 to Curtis discloses another telephone test line type device.

U.S. Pat. No. 3,951,248 to Feiner discloses a telephone visual indicating circuit to enable an installer to determine without actually physically going off the hook what the status of a telephone line is.

U.S. Pat. No. 4,002,861 issued to Putt discloses a modular plug-in telephone test set in a carrying case.

U.S. Pat. No. 4,373,120 to McDonald discloses a line test device used by the telephone company to test the telephone line. It provides a characteristic signature recognizable by the telephone central office when a continuity test is made on the subscriber line.

U.S. Pat. No. 4,564,728 to Romano discloses another embodiment of a telephone line tester. This tester is a simple device which uses a bipolar LED comprised of two parallel light emitting diodes which are arranged between terminals 15 and 16 in opposite polarity The telephone line tester comprised of this bipolar LED has coupled thereto two wires which terminate in a modular plug. The plug is inserted into the telephone jack and if the telephone line is operating properly, one of the diodes will illuminate depending upon the polarity of the lines.

U.S. Pat. No. 4,588,862 to Grabowy is a visual display network interface for placement between incoming telephone network access lines to a structure and the user telephone equipment within the structure.

U.S. Pat. No. 4,600,810 to Feldman is another telephone line tester which determines whether or not there is adequate power in the signal when plugged into the telephone jack.

Overall, there are numerous telephone line testing apparatus but most of the prior art testing apparatus does not provide continuous monitoring of the line and is instead an intermittent test apparatus which requires disconnecting the telephone and then testing the line. Continuous monitoring is important for the average consumer who does not know when his or her line may go dead. In addition, for a blind person, a visual signal is not adequate to warn when the line has gone dead and a supplemental auditory signal is required. In addition, the telephone in the household may only be in one room and the person may not be looking at the telephone for an extended period of time. Therefore, an auditory signal to warn of line failure is also important under normal circumstances in case the telephone is not in easy view of the person. In addition, for a deaf person, an audible signal is not adequate to warn when the line has gone dead and a supplemental visual signal is required.

SUMMARY OF THE PRESENT INVENTION

The present invention is a telephone line monitoring apparatus which is used to continuously monitor the telephone line and provide both a visual signal and an auditory signal if the line becomes inoperative.

It is well known that the standard line voltage into a telephone line is 50 volts and that under normal operation, 50 volts are required for the telephone to ring when the number is dialed. When a local instrument is off-hook and dial tone is heard, the 50 volts drops to nominally 6 to 8 volts DC. If the telephone line is cut or shorted, there is no voltage and the line is inoperative. Accordingly, if the number of the telephone is dialed, it will not ring.

It has been further discovered, according to the present invention, that if a monitoring circuit is wired into the incoming telephone line, which monitoring circuit is capable of sensing the voltage across the incoming line and further provides an auditory and visual signal when the line voltage drops below about 6 volts DC so as to make the telephone line inoperative, then the monitoring system can warn a user when the telephone line has become inoperative in this manner and thereby prevent needless waste of time and problems in waiting for a telephone call when the line is inoperative.

It has further been discovered, according to the present invention, that a continuous monitoring device provides a means wherein the user can be instantaneously forewarned if the line goes dead.

It has additionally been discovered, according to the present invention, that the inclusion of both a visual signal and an auditory signal in the monitoring circuit provides an assured warning system since a visual signal alone may not be sufficient if there is only one telephone which is located in only one room and the telephone is not always in easy viewing of the user.

It has further been discovered, according to the present invention, that the continuous monitoring device can also be used with other telephone line operating devices such as telecopiers, to warn when the telecopier line has gone dead.

It is therefore an object of the present invention to provide a continuous monitoring device which continuously monitors the telephone line for a telephone line operating device such as a telephone or telecopier, and which provides both a visual and auditory signal if one or both of the wires of a telephone line is cut or broken, or if the device is unpluged from the telephone line, or if the two telephone wires are shorted together. The monitoring device is also designed to provide a warning signal if the line voltage drops below about 6 volts DC to thereby make the telephone ring system inoperative.

It is a further object of the present invention to provide a visual and auditory signal only if the telephone line is cut or broken or unplugged or shorted and to not be activated during normal use of the telephone. It is an object of the present invention to provide such a device which, while continuously monitoring the line, will machine responding to an incoming call, a person making a telephone call, a person answering the telephone after a ring, or if a computer answers or makes a call.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
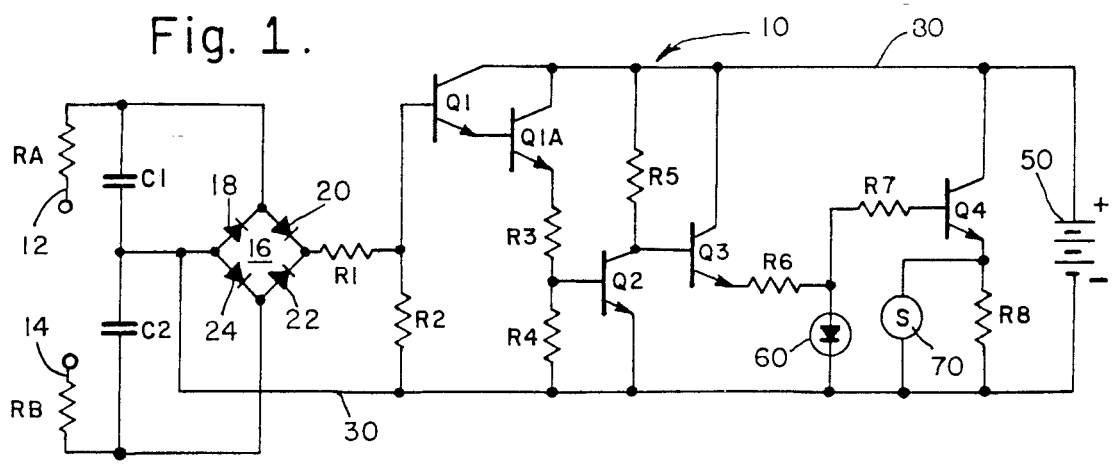
FIG. 1 is a schematic diagram of the circuitry of the preferred embodiment of the present invention which has a nine-volt battery as the power source.

Referring to FIG. 1, there is shown at 10 the schematic diagram of the circuitry of the preferred embodiment of the present invention monitoring device. Lead wires 12 and 14 connect to the incoming two telephone wires. Either lead wire 12 or 14 can connect to the ring incoming wire and the other of the lead wires can connect to the tip incoming wire. The two lead wires 12 and 14 connect to resistors first lead resistor RA and second lead resistor RB respectively, which in turn connect to a bridge circuit 16 made up of four diodes 18, 20, 22 and 24, or a single unit bridge assembly.

Two capacitors C1 and C2 reduce interference from stray 60 Hertz fields, and also introduce a delay. This delay prevents false alarms that might occur from brief and legitimate changes in the telephone line. Either polarity of the phone line may be attached. By way of example, the diodes may be rectifier diodes. One output of the bridge circuit 16 goes to wire 30. The other output of the bridge circuit 16 goes to resistor R1. The output of the bridge going to resistor R1 is always a positive voltage, independent of the polarity of the voltage on the phone line; independent of the existence of a ringing signal; and also independent of "on-hook or off-hook" condition of the local instrument such as a telephone. This positive voltage is lost when the telephone line is no longer connected or is shorted. Resistor R1 limits the quiescent current drawn from the phone network, and also limits the base current into transistor Q1. Resistor R1 is wired in series with resistor R2 and then both are connected to transistor Q1. Resistor R2 provides a defining reference to the semi-conductor connection of bridge diodes and Q1 base. Without R2 the alarm output could be erratic instead of defined and regular. R2 also discharges any capacitance at the base of Q1 when the phone line is no longer connected or is shorted. By way of example, resistors RA and RB may each be 5 megaohm resistors, capacitors CA and CB may each be 0.47 microfarad capacitors with 100 volt rating, resistor R1 may be a 1 megohm, ¼ watt, 5% resistor and resistor R2 may be a 2 megohm resistor.

Transistors Q1 and Q1A are high input-impedance emitter-followers. Transistor Q1 is a first transistor and transistor Q1A is a first supplemental transistor. Jointly they are referred to as first transistor and first supplemental transistor means. The Q1A emitter is normally positive and provides base current to Q2 through resistor R3. Resistor R3 is wired in series with the emitter of transistor Q1A. Resistor R3 is also wired in series with resistor R4 and both resistors are connected to transistor Q2. Resistor R4 provides a defining reference to the semi-conductor connector of Q1A emitter and Q2 base. Without R4 the alarm output could be erratic instead of defined and regular. Resistors R3 and R4 may each be a 1 megohm, ¼ watt, 5% resistor.

Transistor Q2 operates as a switch. Normally the current from Q1A holds Q2 saturated or ON so that its collector voltage is low. Resistor R5 is wired in series with transistor Q2. Current through resistor R5 and a tiny current through transistor Q1A and resistor R3 are drawn from the voltage source 50 which by way of example may be a 9 volt battery. The collector of transistor Q2 goes high when the telephone line is no longer connected or is shorted, and drives the emitter of Q3 high. Resistor R5 may be a 1 megohm, ¼ watt, 5% resistor.

The base of transistor Q3 is wired in series to the collector of transistor Q2. Transistor Q3 is also wired in series with resistor R6 which in turn is connected to the light emitting diode 60. Transistor Q3 is an emitter-follower. Its emitter is normally low, so almost no voltage is applied through resistor R6 to the light emitting diode 60. Thus the light emitting diode 60 is normally off. Resistor R6 may be a 470 ohm resistor. The emitter of Q3 rises to a voltage of about 8 volts DC when the phone line is no longer connected or is shorted. At this voltage, the current through the light emitting diode 60 is limited by resistor R6. The light emitting diode 60 is a self-flashing type. When it flashes ON, the voltage across the light emitting diode 60 drops to about 1 volt DC to 1½ volt DC. across the light emitting diode 60 rises to about the same voltage as the emitter of transistor Q3. The light emitting diode 60 flashing helps draw attention to the alarm condition.

Resistor R6 is wired in series to resistor R7 which in turn is wired in series to transistor Q4. Resistor R7 may be a 22 kilohm resistor. Transistor Q4 is in turn wired in series with resistor R8 which in turn is wired in parallel with an auditory sounder 70. Resistor R8 may be a 10 kilohm resistor. When the phone line is connected, the voltages at the emitter of Q3, and also across the light emitting diode 60, are almost zero. Thus the emitter of the emitter-follower Q4 is also at almost zero volts, and the auditory sounder 70 remains silent. When the light emitting diode 60 begins to flash on and off, the voltage across the light emitting diode 60 is applied to resistor R7. Resistor R7 limits the current into the base of emitter-follower Q4. Due to the rise and fall of voltage across the light emitting diode 60, the auditory sounder 70 is modulated louder and softer to help draw attention to the alarm condition. It is significant that the flashing of the light emitting diode 60 is used as an up-down signal to modulate the auditory sounder 70. This saves the cost of a separate up-down or on-off circuit or device such as the 555 IC. Therefore reliability is greatly increased due to a reduced component count, and the battery drain is reduced significantly.

In the preferred embodiment, the components are wired to a 9 volt battery 50, as shown. Wire 30 leads to the positive terminal of the battery 50 while wire 80 leads to the negative terminal. Power for the flashing light emitting diode 60 and the modulated auditory sounder 70 is taken from the 9 volt battery 50. Any 9 volt battery can be used. However, longest battery life will result from using long-life batteries such as the Duracell Alkaline Battery ®.

The light emitting diode 60 flashes and the auditory sounder 70 is modulated to help draw attention to the alarm condition. If a person is hard of hearing or deaf, the flashing light emitting diode 60 will be the primary alarm. If the light emitting diode 60 becomes hidden behind an object, then the auditory sounder 70 will be the primary alarm to a person with normal or adequate hearing. If the person is blind, then the auditory sounder 70 will be the primary alarm.

The present invention monitoring circuit 10 as described above provides many significant advantages, including: (1) both visual and audible alarms; (2) variable alarm signals to draw attention; (3) almost negligible current drawn from the phone line; (4) low component count for increased reliability; (5) audible alarm loud enough to be heard over normal ambient noises; and (6) use of a flashing light emitting diode to modulate or vary the auditory sounder output thereby eliminating the requirement of a separate flasher circuit. In addition, the unit can be a self-standing unit and is of small size.

Figure 3:
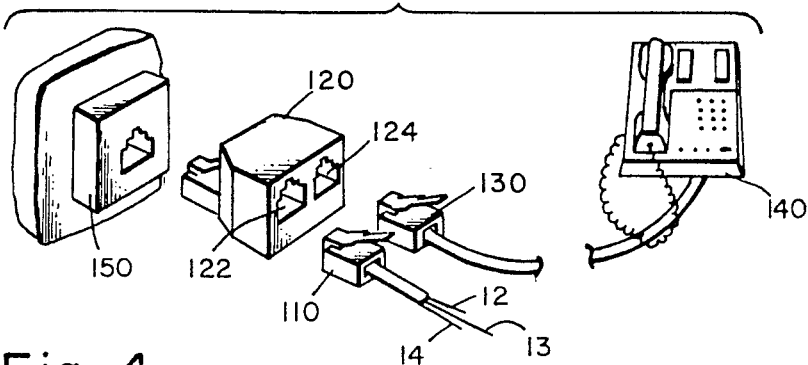
FIG. 3 is a diagrammatic and schematic illustration of the present invention monitoring device wired into an incoming line which is used for a telephone.
Figure 4:
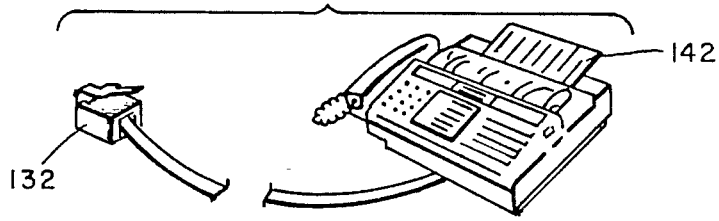
FIG. 4 is a diagrammatic and schematic illustration of the present invention monitoring device wired into an incoming line which is used for a telecopier.

Referring to FIG. 3, in operation, the two lead wires 12 and 14 are wired into a standard telephone cable which ends in a normal telephone plug 110. A dual telephone plug receptacle 120 is plugged into the female telephone receptacle 150 and the plug 130 from the telephone 140 or telecopier 142 is plugged into one receptacle 124 of the dual telephone plug receptacle 120 and the plug 110 from the present invention is plugged into the other receptacle 122. After the unit 10 is plugged into the telephone jack as just described, the unit 10 is opened and a 9 volt battery is installed and the device is closed. The user places the device on a surface, or uses conventional means such as two sided tape to mount the unit 10 on the telephone 140. Therefore, through this embodiment, the telephone line is continuously monitored.

As long as 50 volts is passing into lead wires 12 and 14, the output of bridge 16 going to resistor R1 is always positive and the emitter from transistor Q1A continues to be positive and provides base current to transistor Q2 and resistor R3 and permits transistor Q2 to operate as a switch and cause the sounder 70 and light emitting diode 60 to be in the off position. Once the voltage falls below about 6 volts DC, or the current is cut off on the line is shorted, then the positive voltage going from the bridge circuit 16 to resistor R1 is lost. With this occurrence, the collector of transistor Q2 goes high when the telephone line is no longer connected or is shorted and this drives the emitter of transistor Q3 high. Then the emitter of transistor Q3 rises to a voltage of about 8 volts direct current and causes the light emitting diode 60 to begin flashing as previously described. When the light emitting diode 60 begins to flash on and off, it applies a voltage across resistor R7 which in turn limits the current into the base of emitter-follower transistor Q4 which in turn causes the auditory sounder 70 to become activated. Due to the rise and fall of voltage across the light emitting diode 60, the auditory sounder 70 is modulated louder and softer to help draw attention to the alarm condition.

Defined in detail, the present invention is a telephone line monitoring circuit and apparatus, comprising: (a) circuit connector means for connection into a telephone line jack at one end; (b) a first lead resistor and a second lead resistor connected to said circuit connector means; (c) a first capacitor and a second capacitor connected to each other and connected between said first lead resistor and said second lead resistor; (d) a bridge circuit including a first diode, a second diode, a third diode and a fourth diode, the bridge circuit connected to said first lead resistor at a location between the first and second diode, connected to said second lead resistor at a location between the third and fourth diode, and connected to said first capacitor and said second capacitor at a location between said first and fourth diode; (e) a first resistor connected in series to said bridge circuit at a location between said second and third diode such that a positive voltage is transmitted from the bridge circuit to the first resistor; (f) a second resistor connected in series to said first resistor; (g) said first resistor and said second resistor connected in series to the base of a first transistor which is a high input-impedance emitter-follower; (h) the emitter of said first transistor connected to the base of a first supplemental transistor which is a high input-impedance emitter-follower; (i) the emitter of said first supplemental transistor connected in series to a third resistor; (j) said third resistor connected in series to a fourth resistor; (k) said third resistor and said fourth resistor connected in series to the base of a second transistor; (l) said second transistor connected in series to a fifth resistor; (m) a third transistor which is an emitter-follower connected in series to said second transistor; (n) a sixth resistor connected in series to the emitter of said third transistor; (o) a light emitting diode connected in series to said sixth resistor; (p) said sixth resistor connected in series to a seventh resistor which in turn is connected in series to the base of a fourth transistor; (q) the emitter of said fourth transistor connected in series to an eighth resistor; (r) said eighth resistor connected in parallel to an auditory sounder; (s) a voltage source connected in parallel to said fourth transistor and said eighth resistor; (t) said bridge circuit at a location between said first and fourth diodes, said second resistor, said fourth resistor, the emitter of said second transistor, said light emitting diode, said auditory sounder, and said eighth resistor connected to the negative terminal of said voltage source; and (u) said first transistor, said fifth resistor, said third transistor, and said fourth transistor connected to the positive terminal of said voltage source; (v) whereby when said circuit connection means is connected to a telephone line, the telephone line monitoring circuit and apparatus can detect if the telephone line becomes inoperative and cause said light emitting diode to provide a visual signal and said auditory sounder to provide an audible signal if the telephone line becomes inoperative.

Defined broadly, the present invention is a telephone line monitoring circuit and apparatus, comprising: (a) a circuit connector means for connection into a telephone jack at one end; (b) said circuit connector means connected to a circuit means for providing a positive voltage to a resistor means which in turn provides a defining reference between the circuit means for providing a positive voltage and a first transistor means which is a high input-impedance emitter-follower with a normally positive emitter; (c) the first transistor means connected to resistor means which provides a defining reference between the emitter of said first transistor means and the base of a second transistor means; (d) said second transistor means configured to act as a switch and to provide a driving current to a third transistor means if the telephone line becomes inoperative; (e) said third transistor means is an emitter follower which energizes a light emitting diode and through resistor means and a fourth transistor means also energizes an auditory sounder; and (f) a source of voltage to energize the circuit components; (g) whereby when said telephone line becomes inoperative, said circuit means for providing a positive voltage becomes inoperative to thereby cause said second transistor means to provide a driving current to said third transistor means which causes said light emitting diode to provide a visual signal and which also causes said auditory sounder to provide an audible signal.

Defined even more broadly, the present invention is a telephone line monitoring circuit and apparatus, comprising: (a) a circuit connector means for connection into a telephone jack at one end; (b) a resistance and capacitance means connected to said circuit connector means, the resistance and capacitance means providing interference from stray 60 Hertz fields and introducing a delay in the incoming signal from the telephone line; (c) said circuit connector means connected to a circuit means for providing a positive voltage to a resistor means which in turn provides a defining reference between the circuit means for providing a positive voltage and a first transistor and first supplemental transistor means which are high input-impedance emitter-followers with a normally positive emitter; (d) the first supplemental transistor of said first transistor and first supplemental transistor means connected to transistor means which acts as a switch and causes energy to flow past a point in the circuit if the telephone line becomes inoperative, which energy activates a light emitting diode and through resistor means and additional transistor means also energizes an auditory sounder; and (e) a source of voltage to energize the circuit components; (f) whereby when said telephone line becomes inoperative, said circuit means for providing a positive voltage becomes inoperative to thereby cause the transistor switch means to provide a driving current which causes said light emitting diode to provide a visual signal and which also causes said auditory sounder to provide an audible signal.

Defined very broadly, the present invention is a telephone line monitoring circuit and apparatus, comprising: (a) a circuit connector means for connection into a telephone jack at one end; (b) a resistance and capacitance means connected to said circuit connector means, the resistance and capacitance means providing interference from stray 60 Hertz fields and introducing a delay in the incoming signal from the telephone line; (c) said resistance and capacitance means connected to a circuit means for providing a voltage to a resistor means which in turn provides a current into a first transistor and first supplemental transistor means which are emitter-followers; (d) the first supplemental transistor of said first transistor and first supplemental transistor means connected to resistor means which is connected between the emitter of the first supplemental transistor and the base of a second transistor means; (e) said second transistor means configured to provide a driving current to a third transistor means if the telephone line becomes inoperative; (f) said third transistor means energizes a light emitting diode and through resistor means and a fourth transistor means also energizes an auditory sounder; and (g) a source of voltage to energize the circuit components; (h) whereby when said telephone line becomes inoperative, said circuit means for providing a voltage becomes inoperative to thereby cause said second transistor means to provide a driving current to said third transistor means which causes said light emitting diode to provide a visual signal and which also causes said auditory sounder to provide an audible signal.

Defined most broadly, the present invention is a telephone line monitoring circuit and apparatus, comprising: (a) a circuit connector means for connection into a telephone jack at one end; (b) a resistance and capacitance means connected to said circuit connector means, the resistance and capacitance means providing interference from stray 60 Hertz fields and introducing a delay in the incoming signal from the telephone line; (c) said resistance and capacitance means connected to a circuit means for providing a voltage to a resistor means which in turn provides a current into a first transistor and first supplemental transistor means which are emitter-followers; (d) the first supplemental transistor of said first transistor and first supplemental transistor means connected to transistor means which causes energy to flow past a point in the circuit if the telephone line becomes inoperative, which energy activates a light emitting diode and through resistor means and additional transistor means also energizes an auditory sounder; and (e) a source of voltage to energize the circuit components; (f) whereby when said telephone line becomes inoperative, said circuit means for providing a voltage becomes inoperative to thereby cause transistor means to provide a driving current which causes said light emitting diode to provide a visual signal and which also causes said auditory sounder to provide an audible signal.

Figure 2:
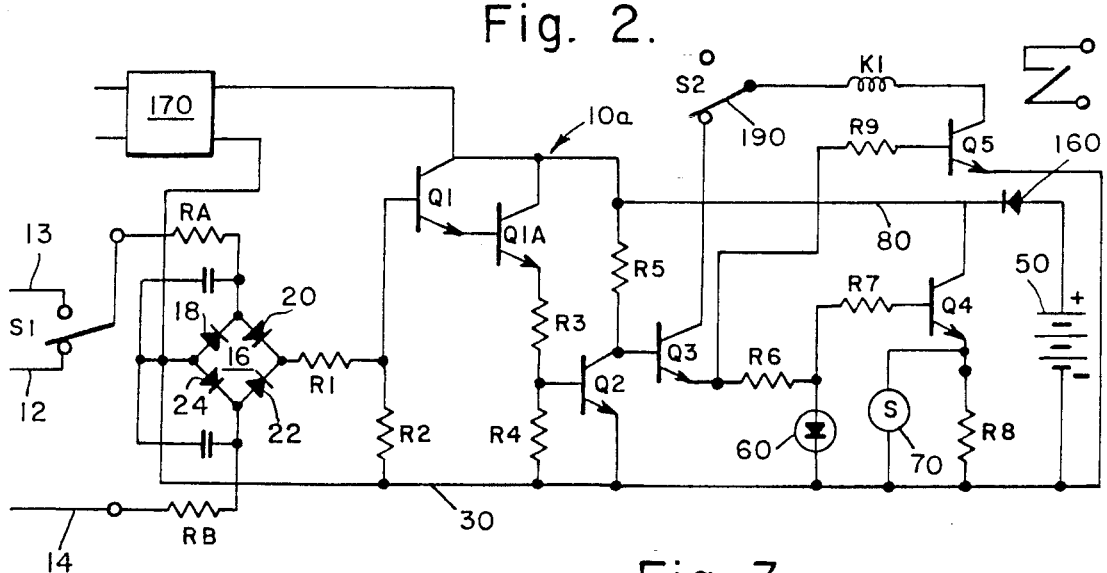
FIG. 2 is a schematic diagram of the circuitry of an alternative embodiment of the present invention which utilizes a standard alternating current source for power and includes an AC to DC transformer, and further incorporates an adjustment wiring scheme to connect the system to a computerized telephone and an interconnecting means to connect the system to an external burglar alarm or similar external warning device.

A second embodiment 10A of the present invention monitoring device is illustrated in FIG. 2. Most of the components in the second embodiment are the same as the first embodiment 10 with the addition of several new components. A diode 160 is added in wire 80 and a Class II transformer 170 with a 9 volt DC output is added into the circuit wires 30 and 80 so that the device may be plugged into a standard alternating current source through Class II transformer 170. The diode 160 serves to block the battery 50 when the Class II 9-volt transformer 170 is plugged into the alternating current source. Another addition to the circuit is a connecting means to connect the circuit to an outside alarming device such as a burglar alarm. Before a burglar breaks in, the burglar often cuts the telephone line to abort the dialing out to the police or security company by a silent alarm system. In this category of inoperative telephone line, it is imperative to annunciate the fact either at a remote location or as a loud local sound such as a siren, or both. The addition provides the present invention with the capability of annunciating remotely or controlling remote devices. The addition of resistor R9, transistor Q5, and relay K1 provides this capability. When an alarm is produced by the circuit as previously described, the emitter of Q3 goes from low to high. This condition causes the flashing light emitting diode 60 to flash, and the sounder 70 to sound high and low, and now also provides current into the base of transistor Q5 through resistor R9. This current switches Q5 from the OFF to the ON condition. The ON condition produces current through the coil of relay K1 to energize K1 so that the single-pole single-throw contacts close. Relay K1 contacts are shown in the de-energized or open condition. This invention also includes relays with a multiplicity of contacts wherein normally closed contacts control other results. One such ancillary result might be a supervisory function associated with an overall security installation. Relay K1 can be a light duty reed relay. Its contacts could control external powerful relays whose contacts in turn control large loads such as sirens, banks or lights, etc. The system can also comprise a manual switch 190 which shuts off resistor R9, transistor Q5 and relay K1. In this way, if the individual is at home, this portion of the system can be disarmed but when the individual leaves his home, this additional portion of the system can be armed. To make the system more versatile, a switch S1 can be added to provide a switching means to different telephone line hook-ups. In a telephone line, the red and green wires 14 and 12 respectively are for a normal telephone or tip/ring line. The yellow and red wires 13 and 14 respectively are used for a computerized phone system with no tip/ring line. A black wire in the phone line is not used. Accordingly, the switch S1 permits either the normal telephone line or the computer telephone line to be used. In all other respects, the alternative embodiment in FIG. 2 operates the same way as the preferred embodiment in FIG. 1.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A telephone line monitoring circuit and apparatus, comprising:
   a. circuit connector means for connection into a telephone line jack at one end;
   b. a first lead resistor and a second lead resistor connected to said circuit connector means;
   c. a first capacitor and a second capacitor connected to each other and connected between said first lead resistor and said second lead resistor;
   d. a bridge circuit including a first diode, a second diode, a third diode and a fourth diode, the bridge circuit connected to said first lead resistor at a location between the first and second diode, connected to said second lead resistor as a location between the third and fourth diode, and connected to said first capacitor and said second capacitor at a location between said first and fourth diode;

e. a first resistor connected in series to said bridge circuit at a location between said second and said third diode such that a positive voltage is transmitted from the bridge circuit to the first resistor;

f. a second resistor connected in series to said first resistor;

g. the junction of said first resistor and said second resistor connected to the base of a first transistor which is a high input-impedance emitter-follower;

h. the emitter of said first transistor connected to the base of a first supplemental transistor which is a high input-impedance emitter-follower;

i. the emitter of said first supplemental transistor connected in series to a third resistor;

j. said third resistor connected in series to a fourth resistor;

k. the junction of said third resistor and said fourth resistor connected to the base of a second transistor;

l. said second transistor connected in series to a fifth resistor;

m. the base of a third transistor which is an emitter-follower connected to the collector of said second transistor;

n. a sixth resistor connected in series to the emitter of said third transistor;

o. a light emitting diode connected in series to said sixth resistor;

p. a seventh resistor connected between the base of a fourth transistor and the junction of said sixth resistor and said light emitting diode;

q. the emitter of said fourth transistor connected in series to an eighth resistor;

r. said eighth resistor connected in parallel to an auditory sounder;

s. a voltage source connected in parallel to said fourth transistor and said eighth resistor;

t. said bridge circuit at a location between said first and said fourth diode, said second resistor, said fourth resistor, the emitter of said second transistor, said light emitting diode, said auditory sounder, and said eighth resistor connected to the negative terminal of said voltage source; and u. said first transistor, said first supplemental transistor, said fifth resistor, said third transistor, and said fourth transistor connected to the positive terminal of said voltage source;

v. whereby when said circuit connection means is connected to a telephone line, the telephone line monitoring circuit and apparatus can detect if the telephone line becomes inoperative and cause said light emitting diode to provide a visual signal and said auditory sounder to provide an audible signal if the telephone line becomes inoperative.

2. A telephone line monitoring circuit and apparatus in accordance with claim 1 wherein said voltage source is a nine volt battery.

3. A telephone line monitoring circuit and apparatus in accordance with claim 1 wherein said circuit connector means further comprises a pair of lead wires connected to a cable which terminates in a telephone plug, with one lead wire connected to said first lead resistor and the other lead wire connected to said second lead resistor.

4. A telephone line monitoring circuit and apparatus in accordance with claim 1 further comprising:

a. a Class II transformer with a 9 volt DC output connected to said second resistor, said fourth resistor, the emitter of said second transistor, said light emitting diode, said auditory sounder, and said eighth resistor connected to the negative terminal of said voltage source at one input location and further connected to said first transistor, said fifth resistor, said third transistor, and said fourth transistor at its second input location; and b. a fifth diode which is a blocking diode connected between said Class II transformer and said voltage source.

5. A telephone line monitoring circuit and apparatus in accordance with claim 1 wherein said light emitting diode is a flashing light emitting diode which modulates the signal of the auditory sounder as the light emitting diode flashes on and off.

6. A telephone line monitoring circuit and apparatus in accordance with claim 1 further comprising relay means energized through a fifth transistor which in turn receives its energy from said third transistor, to thereby connect the system to an external warning means.

7. A telephone line monitoring circuit and apparatus in accordance with claim 1 further comprising switching means to select the circuit input into a normal red and green wire telephone line or into a computer yellow and red wire telephone line.

8. A telephone line monitoring circuit and apparatus, comprising:

a. circuit connector means for connection into a telephone line jack at one end;

b. a first lead resistor which is a 5 megohm resistor and a second lead resistor which is 5 megohm resistor connected to said circuit connector means;

c. a first capacitor which is a 0.47 microfarad capacitor with a 100 volt rating and a second capacitor which is a 0.47 microfarad capacitor with a 100 volt rating connected to each other and connected between said first lead resistor and said second lead resistor;

d. a bridge circuit including a first diode, a second diode, a third diode and a fourth diode, the bridge circuit connected to said first lead resistor at a location between the first and second diode, connected to said second lead resistor as a location between the third and fourth diode, and connected to said first capacitor and said second capacitor at a location between said first and fourth diode;

e. a first resistor which is a 1 megohm ¼ watt 5% resistor connected in series to said bridge circuit at a location between said second and said third diode such that a positive voltage is transmitted from the bridge circuit to the first resistor;

f. a second resistor which is a 2 megohm connected in series to said first resistor;

g. the junction of said first resistor and said second resistor connected to the base of a first transistor which is a high input-impedance emitter-follower;

h. the emitter of said first transistor connected to the base of a first supplemental transistor which is a high input-impedance emitter-follower;

i. the emitter of said first supplemental transistor connected in series to a third resistor which is a 1 megohm ¼ watt 5% resistor;

j. said third resistor connected in series to a fourth resistor which is a 1 megohm ¼ watt 5% resistor;

k. the junction of said third resistor and said fourth resistor connected to the base of a second transistor;

l. said second transistor connected in series to a fifth resistor which is a 1 megohm ¼ watt 5% resistor;
m. the base of a third transistor which is an emitter-follower connected to the collector of said second transistor;
n. a sixth resistor which is a 470 ohm resistor connected in series to the emitter of said third transistor;
o. a light emitting diode connected in series to said sixth resistor;
p. a seventh resistor which is a 22 kilohm resistor connected between the base of a fourth transistor and the junction of said sixth resistor and said light emitting diode;
q. the emitter of said fourth transistor connected in series to an eighth resistor which is a 10 kilohm resistor;
r. said eighth resistor connected in parallel to an auditory sounder;
s. a voltage source connected in parallel to said fourth transistor and said eighth resistor;
t. said bridge circuit at a location between said first and said fourth diode, said second resistor, said fourth resistor, the emitter of said second transistor, said light emitting diode, said auditory sounder, and said eighth resistor connected to the negative terminal of said voltage source; and
u. said first transistor, said first supplemental transistor, said fifth resistor, said third transistor, and said fourth transistor connected to the positive terminal of said voltage source;
v. whereby when said circuit connection means is connected to a telephone line, the telephone line monitoring circuit and apparatus can detect if the telephone line becomes inoperative and cause said light emitting diode to provide a visual signal and said auditory sounder to provide an audible signal if the telephone line becomes inoperative.

9. A telephone line monitoring circuit and apparatus in accordance with claim 8 wherein said voltage source is a nine volt battery.

10. A telephone line monitoring circuit and apparatus in accordance with claim 8 wherein said circuit connector means further comprises a pair of lead wires connected to a cable which terminates in a telephone plug, with one lead wire connected to said first lead resistor and the other lead wire connected to said second lead resistor.

11. A telephone line monitoring circuit and apparatus in accordance with claim 8 further comprising:
a. a Class II transformer with a 9 volt DC output connected to said second resistor, said fourth resistor, the emitter of said second transistor, said light emitting diode, said auditory sounder, and said eighth resistor connected to the negative terminal of said voltage source at one input location and further connected to said first transistor, said fifth resistor, said third transistor, and said fourth transistor at its second input location; and
b. a fifth diode which is a blocking diode connected between said Class II transformer and said voltage source.

12. A telephone line monitoring circuit and apparatus in accordance with claim 8 wherein said light emitting diode is a flashing light emitting diode which modulates the signal of the auditory sounder as the light emitting diode flashes on and off.

13. A telephone line monitoring circuit and apparatus in accordance with claim 8 further comprising relay means energized through a fifth transistor which in turn receives its energy from said third transistor, to thereby connect the system to an external warning means.

14. A telephone line monitoring circuit and apparatus in accordance with claim 8 further comprising switching means to select the circuit input into a normal red and green wire telephone line or into a computer yellow and red wire telephone line.

15. A telephone line monitoring circuit and apparatus, comprising:
a. a circuit connector means for connection into a telephone jack at one end;
b. a resistance and capacitance means connected to said circuit connector means, the resistance and capacitance means providing interference from stray 60 Hertz fields and introducing a delay in the incoming signal from the telephone line;
c. said resistance and capacitance means connected to a circuit means for providing a positive voltage to a resistor means which in turn provides a defining reference between the circuit means for providing a positive voltage and a first transistor and supplemental first transistor means which are high input-impedance emitter-followers with a normally positive emitter;
d. the first supplemental transistor of the first transistor and first supplemental transistor means connected to resistor means which provides a defining reference between the emitter of the first supplemental transistor and the base of a second transistor means;
e. said second transistor means configured to act as a switch and to provide a driving current to a third transistor means if the telephone line becomes inoperative;
f. said third transistor means is an emitter follower which energizes a light emitting diode and through resistor means and a fourth transistor means also energizes an auditory sounder; and
g. a source of voltage to energize the circuit components;
h. whereby when said telephone line becomes inoperative, said circuit means for providing a positive voltage becomes inoperative to thereby cause said second transistor means to provide a driving current to said third transistor means which causes said light emitting diode to provide a visual signal and which also causes said auditory sounder to provide an audible signal.

16. A telephone line monitoring circuit and apparatus in accordance with claim 15 wherein said light emitting diode is a self-flashing type diode which causes the voltage to rise and fall across the diode and which in turn causes the audible signal from said auditory sounder to be modulated.

17. A telephone line monitoring circuit and apparatus in accordance with claim 16 wherein said voltage source is a nine volt battery.

18. A telephone line monitoring circuit and apparatus in accordance with claim 16 further comprising:
a. a Class II transformer with a 9 volt DC output is connected to said telephone line monitoring circuit to enable the circuit to be used with an alternating current source; and
b. a blocking diode connected between said Class II transformer and said voltage source.

19. A telephone line monitoring circuit and apparatus, comprising:
   a. a circuit connector means for connection into a telephone jack at one end;
   b. a resistance and capacitance means connected to said circuit connector means, the resistance and capacitance means providing interference from stray 60 Hertz fields and introducing a delay in the incoming signal from the telephone line;
   c. said circuit connector means connected to a circuit means for providing a positive voltage to a resistor means which in turn provides a defining reference between the circuit means for providing a positive voltage and a first transistor and first supplemental transistor means which are high input-impedance emitter-followers with a normally positive emitter;
   d. the first supplemental transistor of said first transistor and first supplemental transistor means connected to transistor means which acts as a switch and causes energy to flow past a point in the circuit if the telephone line becomes inoperative, which energy activates a light emitting diode and through resistor means and additional transistor means also energizes an auditory sounder; and
   e. a source of voltage to energize the circuit components;
   f. whereby when said telephone line becomes inoperative, said circuit means for providing a positive voltage becomes inoperative to thereby cause the transistor switch means to provide a driving current which causes said light emitting diode to provide a visual signal and which also causes said auditory sounder to provide an audible signal.

20. A telephone line monitoring circuit and apparatus in accordance with claim 19 wherein said voltage source is a nine volt battery.

21. A telephone line monitoring circuit and apparatus in accordance with claim 19 further comprising:
   a. a Class II 9 volt transformer connected to said telephone line monitoring circuit to enable the circuit to be used with an alternating current source; and
   b. a blocking diode connected between said Class II transformer and said voltage source.

22. A telephone line monitoring circuit and apparatus, comprising:
   a. a circuit connector means for connection into a telephone jack at one end;
   b. a resistance and capacitance means connected to said circuit connector means, the resistance and capacitance means providing interference from stray 60 Hertz fields and introducing a delay in the incoming signal from the telephone line;
   c. said resistance and capacitance means connected to a circuit means for providing a voltage to a resistor means which in turn provides a current into a first transistor and first supplemental transistor means which are emitter-followers;
   d. the first supplemental transistor of said first transistor and first supplemental transistor means connected to resistor means which is connected between the emitter of the first supplemental transistor and the base of a second transistor means;
   e. said second transistor means configured to provide a driving current to a third transistor means if the telephone line becomes inoperative;
   f. said third transistor means energizes a light emitting diode and through resistor means and a fourth transistor means also energizes an auditory sounder; and
   g. a source of voltage to energize the circuit components;
   h. whereby when said telephone line becomes inoperative, said circuit means for providing a voltage becomes inoperative to thereby cause said second transistor means to provide a driving current to said third transistor means which causes said light emitting diode to provide a visual signal and which also causes said auditory sounder to provide an audible signal.

23. A telephone line monitoring circuit and apparatus in accordance with claim 22 wherein said light emitting diode is a self-flashing type diode which causes the voltage to rise and fall across the diode and which in turn causes the audible signal from said auditory sounder to be modulated.

24. A telephone line monitoring circuit and apparatus in accordance with claim 22 wherein said voltage source is a nine volt battery.

25. A telephone line monitoring circuit and apparatus in accordance with claim 22 further comprising:
   a. a Class II transformer with a 9 volt DC output is connected to said telephone line monitoring circuit to enable the circuit to be used with an alternating current source; and
   b. a blocking diode connected between said Class II transformer and said voltage source.

26. A telephone line monitoring circuit and apparatus, comprising:
   a. a circuit connector means for connection into a telephone jack at one end;
   b. a resistance and capacitance means connected to said circuit connector means, the resistance and capacitance means providing interference from stray 60 Hertz fields and introducing a delay in the incoming signal from the telephone line;
   c. said resistance and capacitance means connected to a circuit means for providing a voltage to a resistor means which in turn provides a current into a first transistor and first supplemental transistor means which are emitter-followers;
   d. the first supplemental transistor of said first transistor and first supplemental transistor means connected to transistor means which causes energy to flow past a point in the circuit if the telephone line becomes inoperative, which energy activates a light emitting diode and through resistor means and additional transistor means also energizes an auditory sounder; and
   e. a source of voltage to energize the circuit components;
   f. whereby when said telephone line becomes inoperative, said circuit means for providing a voltage becomes inoperative to thereby cause transistor means to provide a driving current which causes said light emitting diode to provide a visual signal and which also causes said auditory sounder to provide an audible signal.

27. A telephone line monitoring circuit and apparatus in accordance with claim 26 wherein said voltage source is a nine volt battery.

28. A telephone line monitoring circuit and apparatus in accordance with claim 26 further comprising:
   a. a Class II transformer connected to said telephone line monitoring circuit to enable the circuit to be used with an alternating current source; and
   b. a blocking diode connected between said Class II transformer and said voltage source.

* * * * *